United States Patent [19]

Higgins

[11] 3,846,691
[45] Nov. 5, 1974

[54] DIRECT CURRENT TO DIRECT CURRENT CHOPPER INVERTER

[75] Inventor: Edward Robert Higgins, North Linthicum, Md.

[73] Assignee: Westinghouse Electric Corporation, Pittsburgh, Pa.

[22] Filed: Feb. 24, 1971

[21] Appl. No.: 118,356

[52] U.S. Cl. .................. 321/2, 321/12, 321/45 ER
[51] Int. Cl. ............................................ H02m 3/32
[58] Field of Search........ 321/2, 27 R, 45 ER, 45 R, 321/45 C, 12

[56] References Cited
UNITED STATES PATENTS

| 3,331,008 | 7/1967 | Bedford | 321/2 |
| 3,337,787 | 8/1967 | Joseph | 321/2 |
| 3,349,314 | 10/1967 | Giannamore | 321/45 C |
| 3,355,653 | 11/1967 | Paradissis | 321/2 |
| 3,443,194 | 5/1969 | Cielo | 321/2 |
| 3,443,195 | 5/1969 | Hoffman et al. | 321/2 |
| 3,509,445 | 4/1970 | Chirgwin et al. | 321/45 R |
| 3,579,078 | 5/1971 | Cronin et al. | 321/2 |

FOREIGN PATENTS OR APPLICATIONS

| 640,333 | 12/1936 | Germany | 321/2 |
| 750,543 | 6/1956 | Great Britain | 321/2 |

OTHER PUBLICATIONS

IEE Paper No. 2984 E, "Practical Design Problems in Transistor DC/DC Convertors and DC/AC Inverters," pp. 1373 & 1374 only, April 1960.

Primary Examiner—William H. Beha, Jr.
Attorney, Agent, or Firm—D. Schron

[57] ABSTRACT

Circuitry for converting direct current at one voltage level to direct current at another voltage level by the use of alternately fired transistor switches or the like feeding into a transformer, and incorporating flyback transformer means to prevent large current spikes and dissipated energy when the ON times of the transistors overlap, when the transistor switches are driven with pulses of unequal widths, or when the transformer primary turns on either side of a center tap are unequal. The basic concept of the invention is to connect a winding of an inductive energy storing flyback transformer in series with one or more chopper switches so that when the switch or switches are closed, the switch current is limited by the presence of the energy storing flyback transformer. When the switches are open, the stored energy of the flyback transformer is allowed to transfer current to a load through a diode.

5 Claims, 4 Drawing Figures

DIRECT CURRENT TO DIRECT CURRENT CHOPPER INVERTER

BACKGROUND OF THE INVENTION

As is known, one type of direct current to direct current center-tapped chopper inverter consists of a pair of transistor switches or the like for alternately connecting one terminal of a direct current source to opposite ends of a transformer primary winding, the center tap on the primary winding being connected to the other terminal of the direct current source. In this manner, pulses of alternate polarity will appear across the transformer secondary; and these can be rectified to produce a direct current of higher or lower voltage than that applied to the primary, depending upon the turns ratio of the transformer.

A circuit of this type is designed such that one transistor conducts while the other is cut off, and vice versa. However, it sometimes happens that the ON times of the transistors overlap. When this occurs, the net ampere turns on the transformer primary winding is zero, and the input is effectively shorted to ground, giving rise to damaging current spikes. Furthermore, if the two transistors are driven with pulses of unequal widths or the transformer primary turns are unequal, the transformer becomes effectively driven from a low impedance voltage, meaning that the currents can again rise to damaging levels. Finally, due to slow recovery of the secondary rectifiers during turn on of a drive transistor, the rectifiers permit a reverse current to flow which becomes a short circuit reflected to the primary which results in high primary currents during this recovery time. Other chopper arrangements are possible in which the transformer primary center tap is not connected to ground but wherein damaging current spikes can occur, for example, when the two chopper switches are ON at the same time.

In prior art inverters of this type, these difficulties are tolerated by taking precautions to assure that the pulse widths are balanced and that the transistors are never driven on simultaneously. Moreover fast recovery diodes are used and switching frequencies are kept low such that uncertainties in pulse widths will result in tolerable operating currents. The inherent presence of these currents results in greater RFI noise, higher stressed components, more complex designs to maintain careful balance of pulses, and lower switch frequencies which necessitate larger reactive components and slower response systems.

In the past, attempts have been made to circumvent these problems by connecting the output of the rectifier on the transformer secondary winding across a portion of an inductive choke in the transformer such that the stored energy in the transformer which occurs upon a mismatch in primary turns ratio or pulse widths is permitted to discharge through the output choke. Although this circuit has some merit, the operation becomes less advantageous at high duty factors of the primary switches.

SUMMARY OF THE INVENTION

In accordance with certain embodiments of the invention shown herein, a direct current to direct current chopper inverter is provided comprising a pair of transistor switches or the like alternately connecting one terminal of a direct current source to opposite ends of a transformer primary winding. Connected across the transformer secondary winding is a rectifier coupled to an output smoothing capacitor. The center tap of the transformer primary winding is connected back to the aforesaid direct current source through the primary winding of a second flyback transformer. The secondary winding of this flyback transformer, in turn, is connected through a unidirectional current device to the output smoothing capacitor. In this manner, the current in the primary winding of the chopper transformer is limited by the charging of the serially-connected primary winding of the flyback transformer, meaning that damaging current spikes cannot occur. At the same time, when the chopper switches are both open, the stored energy in the flyback transformer is discharged through the aforesaid unidirectional current device into the smoothing capacitor. Therefore, the flyback transformer, in addition to preventing damaging currents, acts as an energy storage device which discharges energy into the load when the chopper switches are OFF.

Other embodiments of the invention shown herein do not employ a center-tapped primary winding but nevertheless employ the basic idea of a flyback transformer winding in series with chopper switches for limiting switch current.

The above and other objects and features of the invention will become apparent from the following detailed description taken in connection with the accompanying drawings which form a part of this specification, and in which.

DESCRIPTION OF THE PREFERRED EMBODIMENTS

Figure 1:
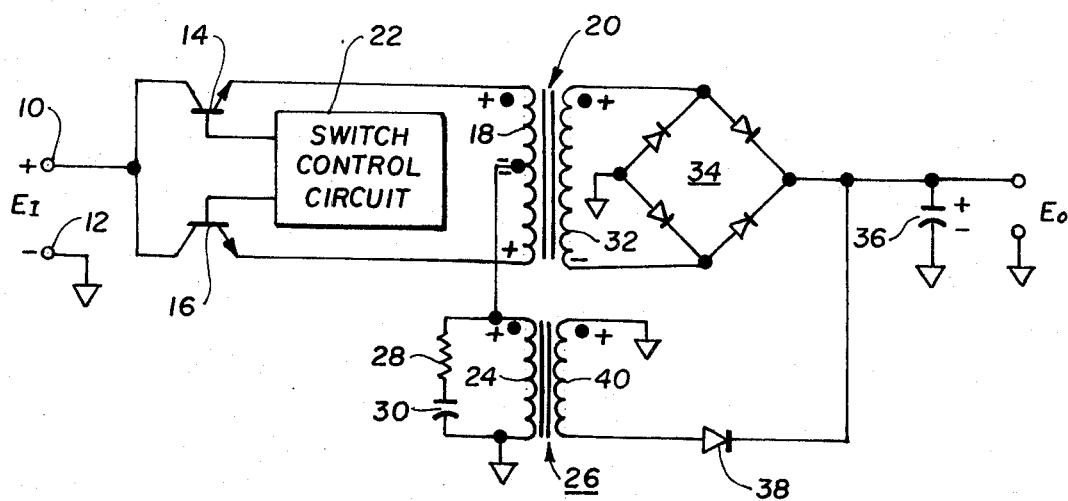
FIG. 1 is a schematic circuit diagram of one embodiment of the invention.

With reference now to the drawings, and particularly to FIG. 1, the circuit shown includes a pair of input terminals 10 and 12 to which a source of direct current, not shown, is applied with the polarity indicated. That is, terminal 10 is positive with respect to terminal 12 which is grounded. The terminal 10 is connected through the collectors and emitters of two switching transistors 14 and 16 to the opposite ends of a primary winding 18 on transformer 20. The bases of transistors 14 and 16, in turn, are connected to a switch control circuit 22 which is designed to turn the two transistors ON alternately.

A center tap on the primary winding 18 of transformer 20 is connected through the primary winding 24 of a second energy storage transformer or flyback transformer 26 to ground and, hence, back to the input terminal 12. In shunt with the primary winding 24 are a resistor 28 and capacitor 30 in series.

The secondary winding 32 of transformer 20 is connected through a full-wave bridge rectifier 34 to an output smoothing capacitor 36 across which the output direct current $E_0$ will appear. The relationship of the output voltage $E_0$ with respect to the input voltage $E_i$ will, of course, depend upon the turns ratio of the transformer 20. Also connected to the ungrounded terminal of capacitor 36 through diode 38 is the secondary winding 40 of flyback transformer 26, the other end of this winding being grounded as shown.

In order to explain the operation of the chopper, it will be assumed that the transistor 14 is initially conducting. Under these circumstances, a voltage will appear across the upper half of the primary winding 18 with the polarity shown, thereby producing a voltage across the secondary winding with the polarity shown. When rectified, this will produce a voltage across capacitor 36 with the polarity shown. When transistor 14 cuts off and transistor 16 conducts, a voltage will appear across the lower half of primary winding 18 with the polarity shown; and the voltage across the secondary winding 32 will be reversed. When rectified, however, this will produce a voltage with the same polarity as indicated across capacitor 36.

Neglecting, for the moment, the flyback transformer 26, a condition can occur wherein both switches 14 and 16 are ON at the same time. Under these circumstances, the opposing voltages on the upper and lower halves of the primary winding 18 produce a net ampere turns of zero. If the center tap of winding 18 is grounded, as is usual, the input under these circumstances is effectively shorted to ground, giving rise to large current spikes which can damage the transistors 14 and 16 and other circuit components. Furthermore, if transistors 14 and 16 are driven with unequal pulse widths or the transformer primary turns are unequal above and below the center tap, the transformer is, in effect, driven from a low impedance voltage source where the currents can again rise to damaging levels. Finally, due to slow recovery of the diodes in the bridge rectifier 34 during the turn ON of the drive transistors, they permit a reverse current to flow which becomes a short circuit reflected to the primary resulting in high primary currents during this recovery time.

In accordance with the present invention, the center tap on the primary winding 18, instead of being connected directly to ground, is connected through the primary winding 24 of flyback transformer 26 to ground. Under these circumstances, when transistor 14 is turned ON, current flows in the top half of the primary winding 18 and also flows in the primary winding 24 to produce a voltage thereacross with the polarity indicated. This produces the polarity indicated in FIG. 1 across the secondary winding 40, meaning that the diode 38 is back-biased. The same is true when the switch 16 is turned ON since, during this time, the polarity across the primary winding 24 is the same as that shown in the drawings. The inductance of primary winding 18 is high and, acting as a current transformer, a current proportional to the primary current is rectified by the rectifier 34 and applied to the capacitor 36 when either switch 14 or 16 is ON. When both of the switches 14 and 16 are OFF, current can no longer flow in the primary winding 24 of flyback transformer 26. Consequently, the stored inductive energy of the transformer discharges through diode 38 into capacitor 36, again with the polarity shown. With both switches OFF, very little current is supplied by the bridge rectifier 34 since transformer 20 has very little stored energy.

The operation can be summarized by stating that during conduction of the switches 14 and 16, energy is supplied by transformer 20. On the other hand, during the OFF times of transistors 14 and 16, energy is supplied by the flyback transformer 26 through diode 38. If the inductance of the primary winding 24 of flyback transformer 26 is sufficiently large, the ampere turns remains relatively constant, independent of whether the switches 14 and 16 are open or closed or which one is open or closed. Thus, the switch currents tend to be of equal amplitude and constant. In the event both switches 14 and 16 are turned ON simultaneously, the current is limited again by the flyback transformer 26 so that destructive currents do not occur. Capacitor 36 receives a non-interrupted charge current, except when both switches are ON simultaneously, due to the fact that either transformer 20 or transformer 26 is supplying current. By proper selection of the turns ratio of transformers 20 and 26, the charge current into capacitor 36 can be free of steps due to unequal currents being supplied by these two transformers. The resistor 28 and capacitor 30 are included in the circuit since the leakage inductance of winding 34 requires an RC series transient suppressor to limit the transient voltage spike on the switches. Other methods of limiting the voltage spikes can be used such as diode clamps to other supplies are Zener diode voltage limiters.

In view of the fact that the secondary winding of transformer 20 is connected to a regulated voltage output, the flux density of transformer 20 is determined by the load voltage, not the input voltage. This can result in a smaller transformer 20 since it need not handle the input transient voltages. Furthermore, the total output power is not supplied by the transformer 20.

Figure 2:
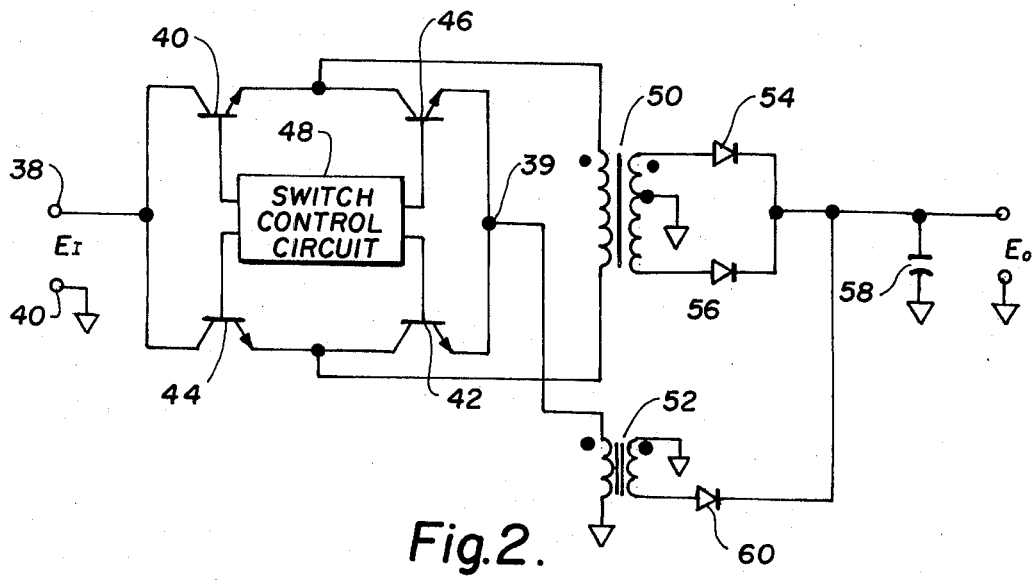
FIG. 2 is a schematic circuit diagram of another embodiment of the invention.

In FIG. 2, another embodiment of the invention is shown which includes a pair of input terminals 38 and 40, the terminal 40 being grounded. The terminal 38 is connected to a switching bridge comprising transistors 40 and 42 and transistors 44 and 46 connected to a switch control circuit 48. The junction of transistors 40 and 46 is connected to one side of the primary winding of transformer 50 while the junction of transistors 44 and 42 is connected to the other end of the primary winding of transformer 50. The terminal 39 diagonally opposite of terminal 38 of the bridge circuit is connected through the primary winding of a flyback transformer 52 to ground.

The secondary winding of transformer 50 is grounded as shown; and its two ends are connected through diodes 54 and 56 to one terminal of capacitor 58, the other terminal of which is grounded. The secondary winding of transformer 52 is connected through diode 60 to the capacitor 58 as shown.

Operation of the circuit of FIG. 2 is essentially the same as that of FIG. 1 except that transistors 40 and 42 conduct as a pair, followed by conduction of transistors 44 and 46. When transistors 40 and 42 conduct, a voltage is produced across the primary winding of transformer 50 with the polarity shown. However, when switches 44 and 46 conduct, the polarity across the primary winding of transformer 50 reverses. The polarity across the primary winding of flyback transformer 52, however, remains the same when the switches are conducting and, hence, diode 60 remains back-biased, except when the transistor switches are cut off and the stored energy in flyback transformer 52 can discharge into the capacitor 58. During one-half cycle of operation, the polarity across the secondary winding of transformer 50 will be such as to cause the diode 54 to conduct; whereas when the polarity is reversed, diode 56 conducts. Aside from this, the operation of the circuit is essentially the same as that of FIG. 1 with flyback transformer 52 limiting currents in the primary winding of transformer 50 and acting to supply current to the capacitor 58 during the OFF times of the switching transistors.

Figure 3:
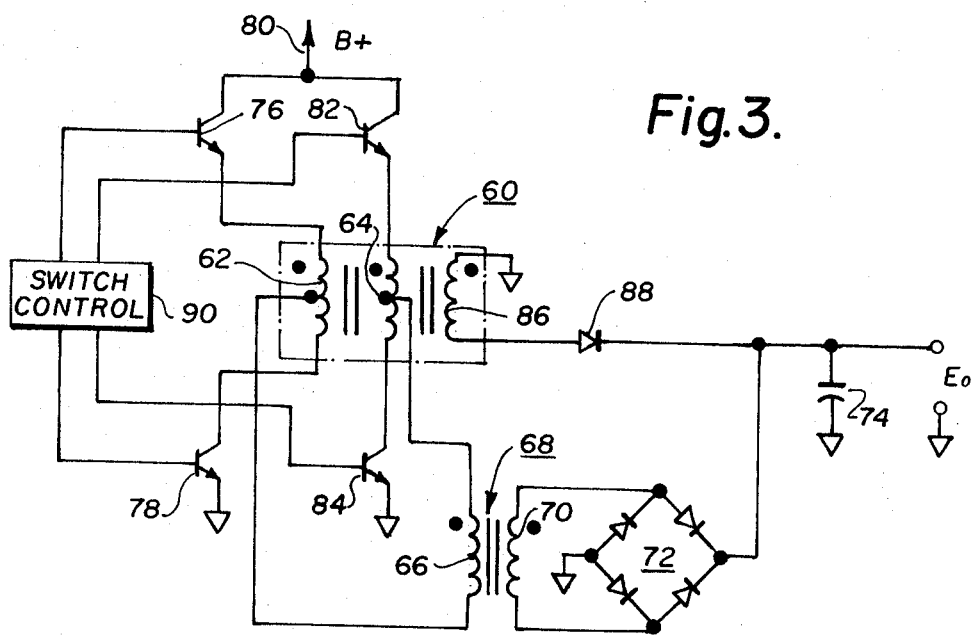
FIG. 3 is a schematic illustration of a further embodiment of the invention.

With reference now to FIG. 3, another embodiment of the invention is shown wherein the energy storing flyback transformer 60 is provided with two primary windings 62 and 64. The center taps on the primary windings 62 and 64 are connected, in turn, to the opposite ends of a primary winding 66 on output transformer 68. The secondary winding 70 of transformer 68 is connected through full-wave rectifier 72 to one end of an output smoothing capacitor 74 in a manner similar to the embodiments of FIGS. 1 and 2.

The opposite ends of the primary winding 62 are connected through transistor switches 76 and 78 to the positive terminal 80 of a source of potential and to ground, respectively. Similarly, transistor switches 82 and 84 connect the opposite ends of winding 64 to the terminal 80 and ground. A secondary winding 86 on the flyback transformer 60 has its one end grounded and its other end connected through diode 88 to the smoothing capacitor 74. The transistor switches 76, 78 and 82, 84 are controlled by switch control circuitry, generally indicated by the reference numeral 90.

In the operation of the circuit of FIG. 3, switch 82 will be ON while switch 78 is ON and the other two switches are OFF. Similarly, switches 76 and 84 will be ON while switches 82 and 78 are OFF. Assuming that switches 82 and 78 are ON, current will flow through the upper half of winding 64, through winding 66, through the lower half of winding 62 and through switch 78 to ground. On the next half cycle, switches 82 and 78 close and switches 76 and 84 open, whereby current now flows through the upper half of winding 62, through winding 66 in the reverse direction, and through the lower half of winding 64 and switch 84 to ground.

It can be seen that during the normal flow of current through the windings 62 and 64, a potential is established across the secondary winding 86 such that its lower end is negative with respect to its upper, grounded end. Consequently, the diode 88 will not conduct under these circumstances. However, if a condition should occur where all of the switches are open, the current through the windings will reverse whereby the lower end of winding 86 is now positive to cause the diode 88 to conduct and permit the stored energy of the flyback transformer to flow to the smoothing capacitor 74 through diode 88.

Figure 4:
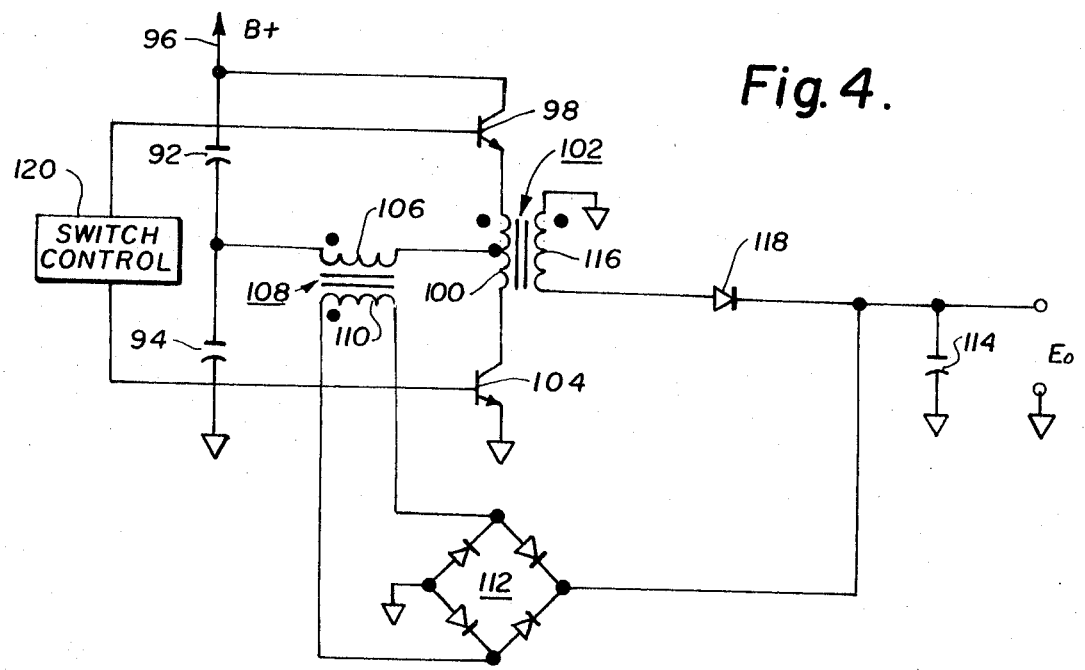
FIG. 4 is a schematic illustration of still another embodiment of the invention.

In FIG. 4, still another embodiment of the invention is shown wherein the potential source is applied across a pair of capacitors 92 and 94 in series. Thus, the capacitors 92 and 94 will be charged with the polarity shown. The positive terminal 96 is connected through transistor switch 98 to the upper end of the primary winding 100 of an energy storing flyback transformer 102. Similarly, the grounded end of capacitor 94 is connected through transistor switch 104 to the lower end of the primary winding 100. A center tap on winding 100 is connected through primary winding 106 of output transformer 108 to the junction between capacitors 92 and 94. The secondary winding 110 on output transformer 108 is connected through full-wave rectifier 112 to the output smoothing capacitor 114 in a manner similar to the embodiments previously described.

The secondary winding 116 on the flyback transformer 102 is again connected through a diode 118 to the smoothing capacitor 114 in order that stored energy can be discharged into the capacitor 114 when both switches 98 and 104 are open. The switches 98 and 104 are controlled by switch control circuitry 120.

The operation of the circuit of FIG. 4 is somewhat similar to that of FIG. 1. That is, when switch 98 is open, current will flow through the upper half of winding 100 and winding 106, causing current to flow through the secondary winding 110 in one direction. When switch 98 closes and switch 104 opens, the current flow through the secondary winding 110 is reversed. With both switches open, for example, the flyback transformer 102 acts to transfer the stored energy of the transformer to the capacitor 114 through diode 118.

Although the invention has been shown in connection with certain specific embodiments, it will be readily apparent to those skilled in the art that various changes in form and arrangement of parts may be made to suit requirements without departing from the spirit and scope of the invention. In this respect, it will also be understood that gate controlled switches, semiconductive controlled rectifiers and other switching devices can be used in place of the switching transistors shown herein.

I claim as my invention:

1. A chopper inverter comprising a pair of terminals adapted for connection to a source of direct current, a transformer having primary and secondary windings, at least one pair of switch devices for alternately connecting one terminal of said direct current source to opposite ends of the primary winding of said transformer, an output smoothing capacitor, means including a rectifier connecting the secondary winding of said transformer across said output smoothing capacitor, a flyback transformer having primary and secondary windings, means including the primary winding of said flyback transformer for connecting a center tap on the primary winding of said first-mentioned transformer to said other input terminal, and unidirectional current means connecting the secondary winding of said flyback transformer to said output smoothing capacitor.

2. The inverter of claim 1 wherein said switch devices comprise transistors.

3. The inverter of claim 1 including the series combination of a resistor and capacitor connected in shunt with the primary winding of said flyback transformer.

4. The inverter of claim 1 wherein said unidirectional current device connecting the secondary winding of said flyback transformer to said output smoothing capacitor is poled to conduct current when both switch device in said pair of switch device are open and stored energy discharges through said unidirectional current device into said smoothing capacitor.

5. The inverter of claim 1 wherein said rectifier connecting said primary winding of the first-mentioned transformer to said smoothing capacitor is a full-wave bridge rectifier.

* * * * *